US012766641B2

(12) United States Patent
Gemignani et al.

(10) Patent No.: US 12,766,641 B2
(45) Date of Patent: Oct. 20, 2026

(54) HOUSING FOR A LASER PROCESSING MACHINE AND LASER PROCESSING MACHINE HAVING A HOUSING

(71) Applicant: BLM S.P.A., Cantù (IT)

(72) Inventors: Roberto Gemignani, Cantù (IT); Andrea Crosato, Cantù (IT); Davide Raffaelli, Cantù (IT); Corrado Cattaneo, Cantù (IT); Giovanni Riva, Cantù (IT); Andrea Colombo, Cantù (IT)

(73) Assignee: BLM S.P.A., Cantu (IT)

( * ) Notice: Subject to any disclaimer, the term of this patent is extended or adjusted under 35 U.S.C. 154(b) by 987 days.

(21) Appl. No.: 18/073,746

(22) Filed: Dec. 2, 2022

(65) Prior Publication Data

US 2023/0173618 A1 Jun. 8, 2023

(30) Foreign Application Priority Data

Dec. 3, 2021 (IT) ........................ 102021000030653

(51) Int. Cl.
*B23K 26/70* (2014.01)
*B23K 37/006* (2025.01)
(Continued)

(52) U.S. Cl.
CPC .......... *B23K 26/706* (2015.10); *B23K 37/006* (2013.01); *B23Q 1/64* (2013.01); *B23Q 11/0891* (2013.01)

(58) Field of Classification Search
CPC .... B23K 26/00; B23K 26/706; B23K 26/702; B23K 26/12; B23K 37/006;
(Continued)

(56) References Cited

U.S. PATENT DOCUMENTS 3,774,522 A * 11/1973 Marsh .................... A61G 10/02 454/251
8,458,961 B2 * 6/2013 Reid ....................... E04H 1/125 52/36.1

(Continued)

FOREIGN PATENT DOCUMENTS

DE 1020150098799 A1 2/2016
WO 2017103780 A1 6/2017

OTHER PUBLICATIONS

Machine translation of Ratti et al (DE102015009879) performed on Nov. 18, 2025 (Year: 2016).*

(Continued)

*Primary Examiner* — Brian W Jennison
(74) *Attorney, Agent, or Firm* — McCarter & English, LLP

(57) ABSTRACT

A housing for a laser processing machine is described to treat work pieces. The housing comprises a dividing wall, which separates a first work space having a first length and a second work space having a second length from one another, a first entrance to allow access to the first work space, a second entrance to allow access to the second work space, a closing device, which is configured to selectively open and close the first entrance and the second entrance and a control unit, which is operatively connected to the closing device. The dividing wall is placeable in an operating position, which is variable among at least a first position, a second position and a third position. The control unit is configured to control the closing device as a function of the operating position of the dividing wall.

15 Claims, 4 Drawing Sheets

(51) Int. Cl.
*B23Q 1/64* (2006.01)
*B23Q 11/08* (2006.01)

(58) Field of Classification Search
CPC ............ B23K 37/0235; B23K 37/0408; B23Q 11/0891; B23Q 1/64; F16P 1/06
See application file for complete search history.

(56) References Cited

U.S. PATENT DOCUMENTS

| | | | | |
|---|---|---|---|---|
| 2011/0126463 | A1* | 6/2011 | Skibinski | E06B 7/16<br>49/70 |
| 2012/0211499 | A1* | 8/2012 | Clement | A45C 11/20<br>220/592.2 |
| 2018/0361522 | A1* | 12/2018 | Fornasero | B23Q 1/64 |

OTHER PUBLICATIONS

Italian Seach Report dated Jun. 23, 2022 for Italian Application No. 202100030653.

* cited by examiner

HOUSING FOR A LASER PROCESSING MACHINE AND LASER PROCESSING MACHINE HAVING A HOUSING

CROSS-REFERENCE TO RELATED APPLICATIONS

This patent application claims priority from Italian patent application no. 102021000030653 filed on Dec. 3, 2021, the entire disclosure of which is incorporated herein by reference.

TECHNICAL FIELD

The present invention relates to a housing, in particular having a first work space and a second work space, for a laser processing machine.

Advantageously, the present invention also relates to a laser processing machine having a housing with a first work space and a second work space.

BACKGROUND

Laser processing machines for treating, by means of a laser device, work pieces are known. Such treatments can be for example the cutting and/or the incision of the work pieces, the laser welding and others. Since the laser radiations used during such treatments can be harmful for an operator, such laser processing machines must comprise a housing which allows screening the laser radiations.

Some of the laser processing machines comprise a housing which has a first work space and a second work space separated from one another by means of a dividing wall.

It is known that such laser processing machines comprise at least one laser device which can be placed both in the first work space to carry out a laser processing in the first work space and in the second work space to carry out a processing in the second work space.

Furthermore, the housing has a first entrance and a second entrance for accessing the first work space and the second work space, respectively. Additionally, the housing also comprises a first door and a second door for selectively opening and closing the first entrance and the second entrance, respectively. An advantage of this type of housing lies in the fact that it is possible to carry out a laser processing in one between the first work space and the second work space and to load and/or unload work pieces in the other between the first work space and the second work space. It should be noted that the other between the first work space and the second work space must anyway be screened.

Typically, the dimensions of the first work space and of the second work space correspond and determine a maximum dimension of the work pieces.

Some housings allow removing the dividing wall so as to treat work pieces which have dimensions greater than the maximum ones defined by the dimensions of the first work space and of the second work space. The removal of the dividing wall also results in the creation of a single work space. This means that it is not possible, as in the case of the presence of the first work space and of the second work space, to carry out a processing in one between the first work space and the second work space and to remove a processed piece and to load a new work piece in the other between the first work space and the second work space.

Therefore, the need is felt in the sector for a further improvement of the housings for laser processing machines and/or of the laser processing machines which allows solving at least one of the known drawbacks.

SUMMARY

The aforementioned objects are achieved by the present invention, since it relates to a housing as defined in the independent claim. Alternative preferred embodiments are protected in the respective dependent claims.

The aforementioned objects are also achieved by the present invention, since it relates to a machine according to claim 13. Alternative preferred embodiments are protected in the respective dependent claims.

BRIEF DESCRIPTION OF THE DRAWINGS

In order to better understand the present invention, a preferred embodiment is described in the following, by way of mere non-limiting example and with reference to the accompanying drawings, wherein.

DESCRIPTION OF EMBODIMENTS

Figure 1:
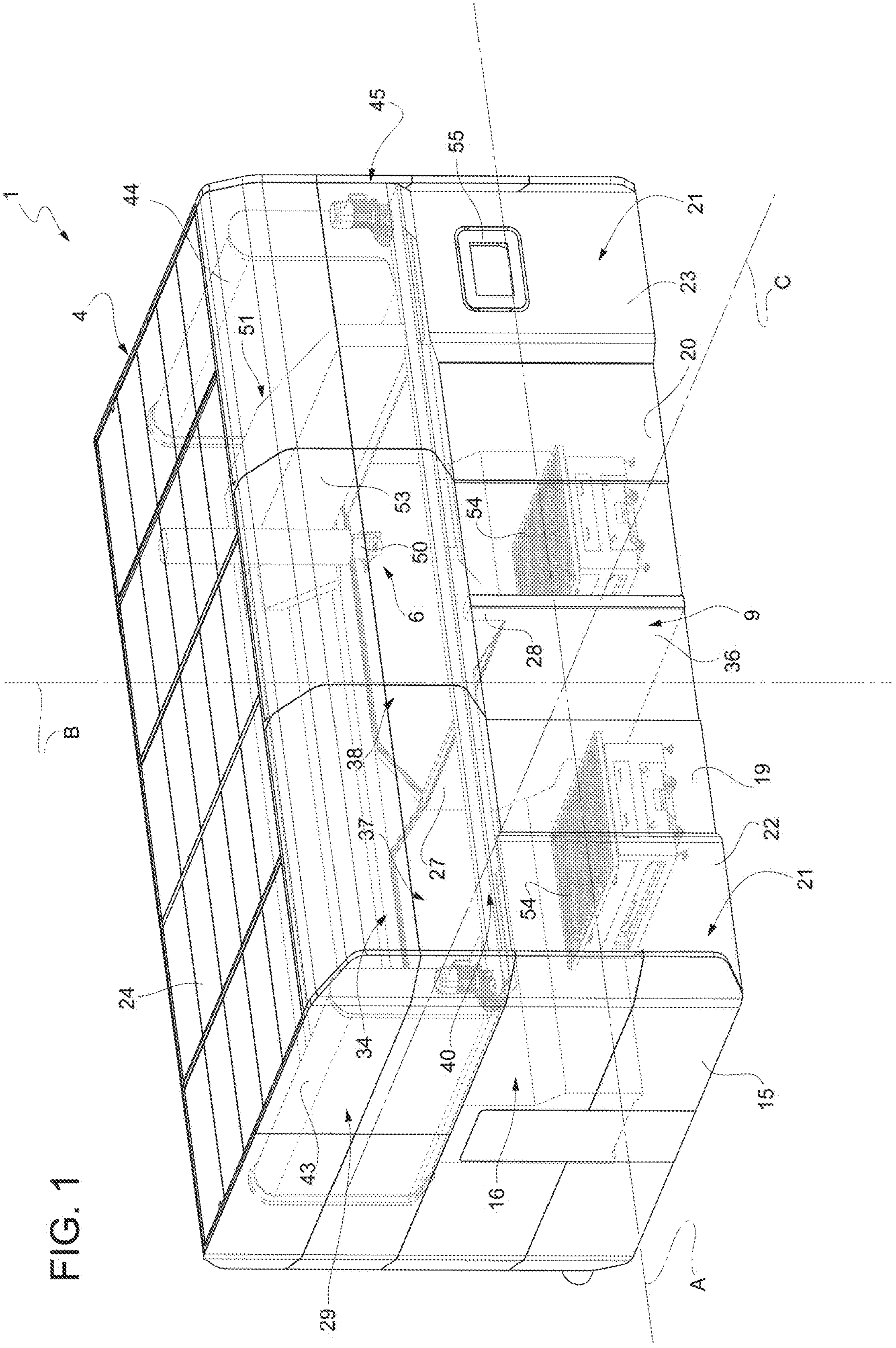
FIG. 1 is an isometric view of a laser processing machine according to the present invention, with parts removed for clarity.

In FIG. 1, reference numeral 1 indicates, as a whole, a laser processing machine for treating, by means of a laser, work pieces 2 for obtaining processed pieces 3.

According to some non-limiting embodiments, the machine 1 can be configured to carry out one or more of the following laser processing processes: cutting, engraving, boring, welding, cropping, butt joining, and other.

According to some non-limiting embodiments, the work piece 2 can comprise, in particular consist of, a metal material such as for example steel, carbon steel, stainless steel, aluminium, brass, copper, titanium alloys and other alloys or any combination thereof.

The work pieces 2 can have complex or simple structures. For example, the work pieces 2 can have respective (complex) three-dimensional structures or bi-dimensional structures.

The work pieces 2 can be for example unfinished products, as possibly obtained by means of curvature, printing, hydroforming or other processes.

For example, work pieces 2 can be curved pipes, formed sheets, other types or combinations thereof.

With reference to FIGS. 1 to 3*c*, the machine 1 comprises a housing 4, in particular having and/or delimiting an inner space 5; and a laser apparatus 6 arranged in the housing 4, in particular in the inner space 5, for carrying out a laser processing on work pieces 2.

In more detail, the housing 4 extends along a first axis A, a second axis B perpendicular to the first axis A and a third axis C perpendicular to the first axis A and to the second axis B. In particular, the first axis A and the third axis C can have respective horizontal orientations and the second axis B can have a vertical orientation.

Preferentially, the extension of the housing 4 along the first axis A can define a width of the housing 4, along the second axis B it can define a height of the housing 4 and along the third axis C it can define a depth of the housing 4.

The housing 4 comprises a first work space 7 and a second work space 8 distinct and separate from one another and each configured to receive work pieces 2.

The housing 4 further comprises a dividing wall 9, in particular placed in the inner space 5, which separates the first work space 7 and the second work space 8 from one another. In other words, the dividing wall 9 is interposed between the first work space 7 and the second work space 8.

Advantageously, the dividing wall 9 is placeable in an operating position. In particular, the dividing wall 9 is variable among at least a first position (see FIG. 3*a*), a second position (see FIG. 3*b*) and a third position (see FIG. 3*c*) distinct from one another. By means of the placing of the dividing wall 9 in the operating position and thanks to the possibility of choosing the position of the dividing wall 9 among at least the first position, the second position and the third position, it is possible to vary and/or determine the dimensions of the first work space 7 and of the second work space.

In particular, the operating position of the dividing wall 9 determines a first length E1 of the first work space 7 and a second length E2 of the second work space 8. Still more in particular, the first length E1 and the second length E2 vary as a function of the operating position, for example depending if the operating position corresponds to the first position, to the second position or to the third position.

Preferentially, the first length E1 and the second length E2 describe an extension of the first work space 7 and of the second work space 8, respectively, along a direction parallel to the first axis A.

In particular, the operating position of the dividing wall 9 can be varied relative to a direction D parallel to the first axis A and/or parallel to the normal of the dividing wall 9.

According to some non-limiting embodiments, the first position and the third position define respective limit operating positions. In other words, the dividing wall 9 can be selectively arranged in the first position, the third position or at least a position, for example the second position, interposed between the first position and the third position. In particular, the first operating position corresponds to a first limit operating position which can determine a first minimum length E1 and a second maximum length E2 and/or the third operating position corresponds to a second limit operating position which can determine a first maximum length E1 and a second minimum length E2.

In further detail, when the operating position of the dividing wall 9 corresponds to the first position (see FIG. 3*a*), the first length E1 can be less and/or the second length E2 can be greater respectively than the respective first lengths E1 and the respective second lengths E2 when the operating position of the dividing wall 9 corresponds to the second position or to the third position. Alternatively or additionally, when the operating position of the dividing wall 9 corresponds to the third position (see FIG. 3*c*), the first length E1 can be greater and/or the second length E2 can be less respectively than the respective first lengths E1 and the respective second lengths E1 when the operating position of the dividing wall 9 corresponds to the second position or to the first position. Alternatively or additionally, when the operating position of the dividing wall 9 corresponds to the second position (see FIG. 3*b*) the first length E1 and the second length E2 are (substantially) identical.

According to some non-limiting embodiments, for example the first length E1 and the second length E2 are (substantially) identical when the operating position corresponds to the first position or to the third position.

According to some non-limiting embodiments, the operating position can be varied between the first position and the third position in a continuous manner (i.e. there is an "unlimited" number of operating positions between the first position and the third position) or in a discrete manner (i.e. there is a limited number of operating positions between the first position and the third position).

In more detail, the dividing wall 9 can extend along an axis parallel to the second axis B and another axis parallel to the third axis C. Preferentially, an extension of the dividing wall 9 along an axis parallel to the axis A can define a thickness of the dividing wall 9.

Preferentially, the dividing wall 9 can extend vertically.

In particular, the dividing wall 9 can define a respective lateral wall of the first work space 7 and of the second work space 8.

Furthermore, the housing 4 can comprise two lateral walls 15, each one being spaced from the dividing wall 9, in particular in a direction parallel to the first axis A. In particular, the dividing wall 9 can be interposed between the two lateral walls 15 for partially delimiting the first work space 7 and the second work space 8.

More specifically, one of the lateral walls 15 can define, together with the dividing wall 9, the first length E1 of the first work space 7 and the other lateral wall 15 can delimit, together with the dividing wall 9, the second length E2. In other words, an extension between the dividing wall 9 and one of the lateral walls 15 along the first axis A determines the first length E1 and an extension between the dividing wall 9 and the other of the lateral walls 15 along the first axis A determines the second length E2.

According to some preferred embodiments, when the dividing wall 9 is placed in the second position, the dividing wall 9 can be equidistant from the two lateral walls 15. Furthermore, when the dividing wall 9 is placed in the first position or in the second position, the dividing wall 9 can be closer to one of the two lateral walls 15.

Furthermore, the housing 4 can also comprise a first auxiliary wall 16 and a second auxiliary wall transverse to the dividing wall 9. In particular, the first auxiliary wall 16 and the second auxiliary wall are spaced apart from one another along a direction parallel to the third axis C and delimit the first work space 7 and the second work space 8 along the direction parallel to the third axis C.

Preferentially, the first auxiliary wall 16 and the second auxiliary wall can face one another.

Preferentially, the first auxiliary wall 16 can be placed in the inner space 5.

Figure 2A:
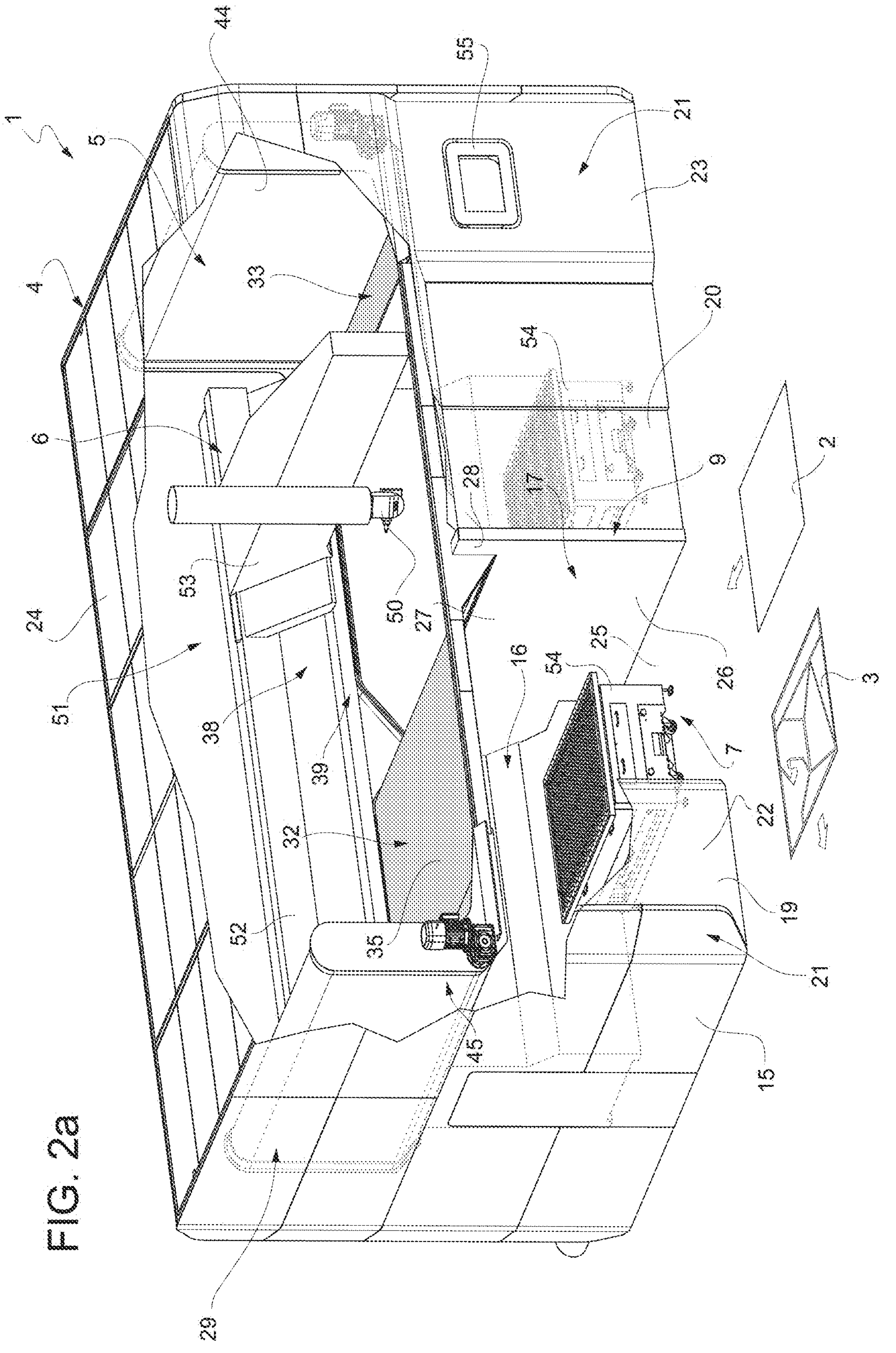
FIGS. 2*a* and 2*b* are isometric views of the laser work processing machine of FIG. 1 in two distinct configurations, with parts removed for clarity.
Figure 2B:
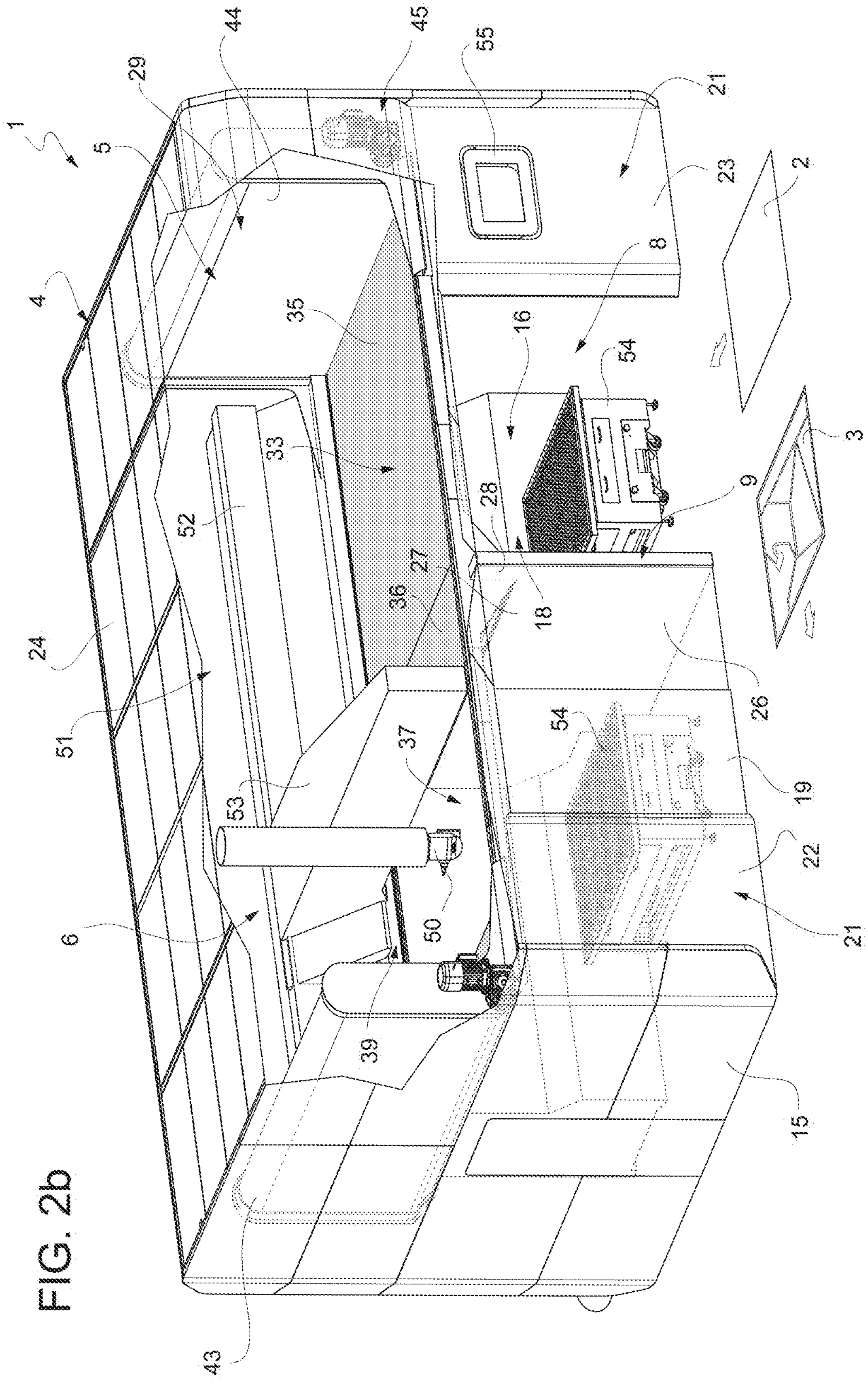
Figure 3A:
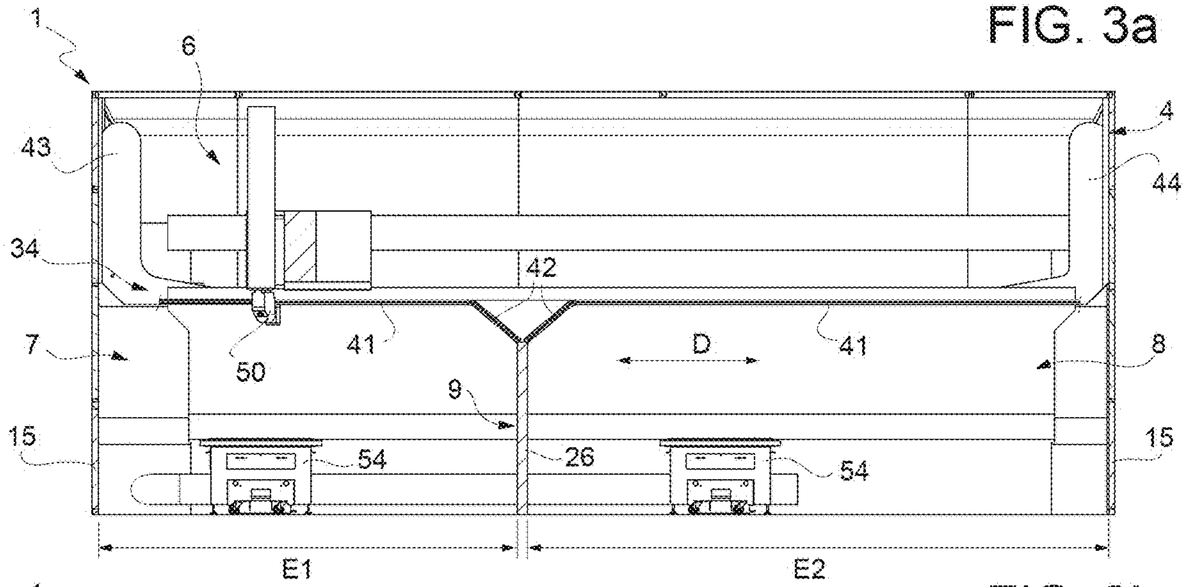
FIGS. 3*a*, 3*b* and 3*c* show a section view of the laser processing machine with the placing of a detail at different positions, with parts removed for clarity.
Figure 3B:
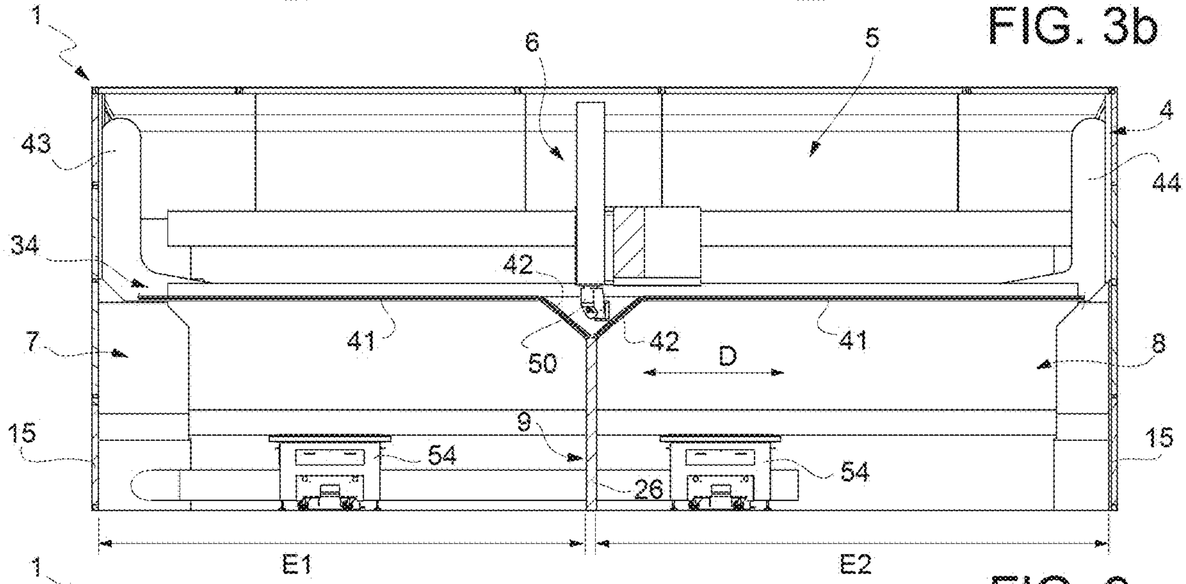
Figure 3C:
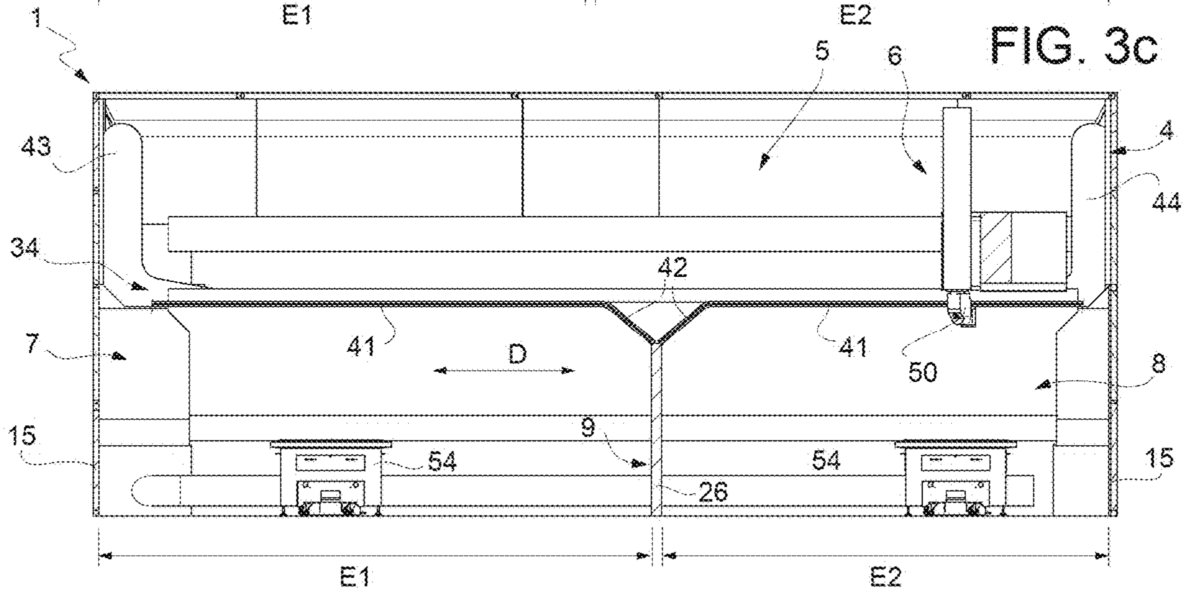

With particular reference to FIGS. 1 to 2*b*, the housing 4 can comprise a first entrance 17 and a second entrance 18 configured to allow access, for example to an operator and/or to a robot, to the first work space 7 and to the second work space 8, respectively, in particular for loading a work piece 2 and/or for unloading a processed piece 3.

Advantageously, the first entrance 17 and the second entrance 18 are variable as a function of the operating position of the dividing wall 9.

In particular, 1*a* operating position of the dividing wall 9 can determine a first extension d1 of the first entrance 17 and a second extension d2 of the second entrance 18 along the first axis A.

Advantageously and thanks to the fact of having the first work space 7 and the second work space 8, it is possible to carry out a laser processing in one between the first work space 7 and the second work space 8 and to unload a processed piece 3 and/or load a work piece 2 in the other between the first work space 7 and the second work space 8.

The housing 4 can comprise a closing device configured to selectively open and close the first entrance 17 and the second entrance 18.

More specifically, the closing device can comprise one or more doors, in particular sliding and/or telescopic doors, so as to selectively open and close the first entrance 17 and the second entrance 18. Still more specifically, the closing device can comprise a first door 19 configured to selectively open and close the first entrance 17 and a second door 20 configured to selectively open and close the second entrance 18.

Considering the fact that the operating position of the dividing wall 9 can vary, it is necessary to control the closing device, in particular the first door 19 and the second door 20, depending on the operating position selectively chosen.

Advantageously, the laser processing machine 1 and/or the housing 4 comprises/comprise a control unit operatively connected to the closing device, in particular to the first door 19 and the second door 20, and in particular also a sensor device operatively connected to the control unit and configured to determine the operating position of the dividing wall 9.

Advantageously, the control unit is configured to control the closing device, in particular to selectively control the first door 19 and the second door 20, as a function of the operating position of the dividing wall 9, in particular as determined by the sensor device. Preferentially, the control unit can also be configured to control the closing device, in particular to selectively control the first door 19 and the second door 20, as a function of the first length E1 and of the second length E2.

In particular, the sensor device can be configured to determine with precision the position of the dividing wall 9 which in turn allows adjusting with precision the closing device, in particular the first door 19 and the second door 20, so as to ensure the selective closing of the first entrance 17 and of the second entrance 18.

According to some non-limiting embodiments, the sensor device can comprise a plurality of reading heads each arranged in the area of a respective possible position of the dividing wall 9. In the specific case, the sensor device can comprise a first reading head arranged in the area of the first position, a second reading head arranged in the area of the second position and a third reading head arranged in the area of the third position.

Preferentially, each reading head can be configured to detect a transmitter mounted on the dividing wall 9 for determining the operating position of the dividing wall 9.

Alternatively or additionally, the sensor device can comprise an (absolute) encoder (indirectly) associated with the dividing wall 9.

Preferentially, the length of each one of the first door 17 and the second door 18 is changeable so as to be adaptable relative to the operating position of the dividing wall 9, in particular as determined by the sensor device.

In more detail, the control unit can be configured to selectively control each one of the first door 19 and the second door 20 between a respective closing configuration and a respective opening configuration, in particular for selectively closing and opening the first entrance 17 and the second entrance 18, respectively. In particular, the first door 19 and the second door 20 close and free the first entrance 17 and the second entrance 18, respectively, when they are controlled in the respective closing configuration and the respective opening configuration, respectively.

In further detail, the control unit can be configured to adjust the first door 19 and the second door 20 to extend from a respective lateral portion 21 of the housing 4 to the dividing wall 9 for closing the first entrance 17 and the second entrance 18, respectively, in particular when it controls, in use, the first door 19 and the second door 20 in the respective closing configuration. In particular, each lateral portion 21 comprises a respective lateral wall 15; in other words, in use, the first door 19 and the second door 20 can selectively extend from the respective lateral wall 15 to the dividing wall 9.

According to some non-limiting embodiments, the housing 4 can comprise a first housing seat 22 for the first door 19 and a second housing seat 23 for the second door 20. In particular, each one of the first housing seat 22 and the second housing seat 23 can be arranged in the area of a respective lateral portion 21.

Preferentially, the control unit can be configured to control the extension of the first door 19 and of the second door 20 depending on the operating position detected by the sensor device so as to align the first door 19 and the second door 20 with the dividing wall 9 when they are controlled in the respective closing configuration. According to some non-limiting embodiments, the extension of the first door 19 and of the second door 20 is controlled so as to establish a contact with the dividing wall 9 when the first door 19 and the second door 20 are controlled in the respective closing configuration.

More specifically, each one of the first door 19 and the second door 20 can extend from the first housing seat 22 and from the second housing seat 23, respectively, to the dividing wall 9 when it is controlled in the respective closing configuration. Furthermore, each one of the first door 19 and the second door 20 can be inserted in the first housing seat 22 and the second housing seat 23, respectively, is controlled in the respective opening when it configuration.

Preferentially, the first door 19 and the second door 20 can be sliding and/or telescopic doors. More specifically, each one of the first door 19 ad the second door 20 can comprise a plurality of leaves configured to slide in front of one another. In particular, each leaf is coupled to at least another leaf in a linearly shiftable manner.

According to some non-limiting embodiments, the housing 4 can comprise a first auxiliary sensor device configured to determine an extension and/or a placing (absolute or relative for example with respect to the dividing wall 9) of the first door 19 and/or of the second door 20, in particular when being controlled in the closing configuration and/or when it is controlled in the closing configuration. Preferentially, the control unit can be configured to adjust the first door 19 and the second door 20 as a function of the measurements of the first auxiliary sensor device, in particular for ensuring a correct closing of the first entrance 17 and of the second entrance 18 with the first door 19 and with the second door 20, respectively, and/or for ensuring that the first door 19 and the second door 20 are aligned and/or in contact with the dividing wall 9 when they are controlled in the respective closing configuration.

Preferentially, the closing device can be configured to open the first entrance 17 and the second entrance 18 while, in use, a laser processing is carried out in the second work space 8 and in the first work space 7, respectively.

Preferentially, in use, the closing device closes the first entrance 17 while the laser apparatus 6 carries out a laser processing in the first work space 7 and/or the second entrance 18 while the laser apparatus 6 carries out a laser processing in the second space 8.

According to some embodiments, the housing 4 can comprise at least a first guide assembly 60, a second guide assembly 61 and a third guide assembly 62 arranged in the inner space 5 and which define the first position, the second position and the third position, respectively. In particular, the dividing wall 9 can be selectively coupled to the first guide assembly 60, to the second guide assembly 61 and to the third guide assembly 62 for placing the dividing wall 9 in the first position, in the second position and in the third position, respectively.

Preferentially, the dividing wall 9 and/or the first guide assembly, the second guide assembly and the third guide assembly can comprise stopping devices configured to fix the dividing wall 9 in a reversible manner.

According to a such embodiment, in use, in order to change the position of the dividing wall 9 it is necessary to decouple the dividing wall 9 from the first guide assembly, from the second guide assembly or from the third guide assembly. Subsequently, it is possible to couple the dividing wall 9 to the first guide assembly, to the second guide assembly or to the third guide assembly.

Preferentially, the first guide assembly, the second guide assembly and the third guide assembly extend in a direction parallel to the third axis C and are arranged with respect to one another along a direction parallel to the first axis A.

Alternatively additionally, the housing 4 can comprise a moving device coupled to the dividing wall 9 and configured to move the dividing wall 9 along a direction normal to the dividing wall 9 between a first limit position which corresponds to the first position and a second limit position which corresponds to the third position. In particular, the direction normal to the dividing wall 9 can be parallel to the axis A.

Preferentially, the moving device can be configured to change the position of the dividing wall 9 in a continuous manner.

According to some non-limiting embodiments, the sensor device can comprise an (absolute) encoder coupled to the moving device, for example to a motor of the moving device, for delimiting the operating position of the dividing wall 9.

With particular reference to FIGS. 1 to 3*c*, the dividing wall 9 can comprise at least one first end portion 26, in particular a lower portion 26, configured to be in contact and/or being in contact with a support surface and a second end portion 27, in particular an upper portion 27, opposite the first end portion 26, in particular along a direction parallel to the second axis B.

According to the illustrated embodiment, the dividing wall 9 can also comprise a protruding portion 28 protruding from the second end portion 27, in particular in a direction parallel to the second axis B.

With particular reference to FIGS. 1, 2*a* and 2*b*, the housing 4 can comprise a covering device 29, in particular placed in the inner space 5, configured to selectively cover at least one between the first work space 7 and the second work space 8. In particular, the covering device 29 can be configured to cover one between the first work space 7 and the second work space 8 and to free the other between the first work space 7 and the second work space 8.

For example, in FIGS. 2*a* and 2*b* the respective conditions in which the covering device 29 covers the first work space 7 and the second work space 8, respectively, are indicated.

This allows carrying out a laser processing in the work space 7 or 8 which is not covered by the covering device 29, while an operator can remove a processed piece 3 and/or insert a new work piece 2 in the other work space 7 or 8 (i.e. the work space 7 or 8 which is covered by the covering device 29).

Advantageously, the control unit can be operatively connected to the covering device 29 and can be configured to control the covering device 29 as a function of the operating position of the dividing wall 9 as determined by the sensor device.

In more detail, the covering device 29 can comprise a first cover 32 and a second cover 33, each controllable at least in an active configuration in which the first cover 32 and the second cover 33 are configured to cover and/or cover the first work space 7 and the second work space 8, respectively.

Considering the fact that the first extension E1 and the second extension E2 can vary as a function of the operating position of the dividing wall 9, it is advantageous to control the first cover 32 and the second cover 33 as a function of the operating position, in particular for ensuring a precise covering.

In particular, the control unit can be configured to control the first cover 32 and the second cover 33 as a function of the operating position of the dividing wall 9, in particular as determined by the sensor device.

More specifically, the first cover 32 and the second cover 33 extend from a respective lateral portion of the housing 4 to the dividing wall 9 when they are controlled in the respective active configurations.

Preferentially, the covering device 29 can also comprise a guide system 34 configured to guide the first cover 32 and the second cover 33 so that the first cover 32 and the second cover 33, when they are in the respective active configurations, comprise at least a respective main portion 35 and a respective auxiliary portion 36 extending transversally from the respective main portion 35.

Preferentially, each main portion 35 has a (substantially) horizontal orientation.

According to some non-limiting embodiments, each one of the first cover 32 and the second cover 33 can be controllable in a respective waiting configuration in which the first cover 32 and the second cover 33 are configured to free and/or free the first work space 7 and the second work space 8, respectively.

In particular, the housing 4 can be configured so that one between the first cover 7 and the second cover 8 can be controlled in the respective active configuration while the other between the first cover 7 and the second cover 8 can be controlled in the waiting configuration.

In more detail, the guide system 34 can comprise a first group of tracks 37 for guiding the first cover 32 so that the first cover 32, when it is in the active configuration, has at least the respective main portion 36 and the respective auxiliary portion 35 and a second group of tracks 38 for guiding the second cover 33 so that the second cover 33, when it is in the active configuration, has at least the respective main portion 35 and the respective auxiliary portion 36.

In more detail, each one of the first group of tracks 37 and the second group of tracks 38 can comprise a respective first track 39 and a second track 40 spaced apart from one another along a respective axis E parallel to the third axis C.

Furthermore, the first track 39 and the second track 40 can each comprise a respective first portion 41 and a respective second portion 42. The first portions 41 can be made and/or configured to support and/or define the respective main portion 35 and the second portions 42 can be configured to support and/or define the respective auxiliary portion 36.

Additionally, each second portion 42 can be connected to and extends from the respective first portion 41 to the second end portion 32.

In particular, each second portion 42 can be inclined relative to the respective first portion 41.

Preferentially, each first portion 41 can extend along a longitudinal axis (substantially) parallel to the first axis A. Still more preferentially, each first portion 41 can be oriented horizontally.

Preferentially, the length of the first portions 39 is selectively adaptable as a function of the operating position of the dividing wall 9, in particular as determined by the sensor device. In this manner, it is possible to adapt the extensions of the main portions 35 as a function of the operating position of the dividing wall 9.

According to some non-limiting embodiments, the housing 4 can also comprise a second auxiliary sensor device configured to determine an extension and/or (absolute or relative) placing of the first cover 32 and/or of the second cover 33, in particular when it is controlled in the active configuration and/or when being controlled in the active configuration. Preferentially, the control unit can be configured to adjust the first cover 32 and the second cover 33 also as a function of the measurements of the second auxiliary sensor device, in particular for selectively aligning the first cover 32 and the second cover 33 with the dividing wall 9.

Preferentially, the second auxiliary sensor device can also be configured to determine the extensions of the first portions 41.

According to some non-limiting embodiments, the housing 4 can also comprise a first housing device 43 and a second housing device 44 for housing the first cover 32 and the second cover 33, respectively, in particular when it is controlled in the respective waiting configuration.

According to some non-limiting embodiments, the housing 4 also comprises an actuating device 45 configured to selectively control the first cover 32 and the second cover 33 between the active configuration and the waiting configuration.

With particular reference to FIGS. 1 to 4, the laser apparatus 6 can comprise one or more laser devices, in the specific case a laser device 50 is illustrated.

The laser apparatus 6 can also comprise a support structure 51, in particular arranged in the inner space 5, carrying the laser device 50 in a movable manner.

In more detail, the support structure 51 can comprise a fixed structure 52 and a movable structure 53 carrying the laser device 50 and coupled in a movable manner to the fixed structure 52. In particular, the movable structure 53 can be movable along a path, in particular a linear path.

Furthermore, the support structure 51 can comprise an actuator for moving the movable structure 53 along the path.

In further detail, the laser device 50 is coupled to the movable structure 53 so as to carry out respective angular movements around one or more rotation axes and a translation along a respective axis (substantially) parallel to the second axis B (for selectively approaching and spacing apart the laser device 50 to or from the work piece 2).

The movable structure 53 can allow selectively placing the laser device 50 in the first work space 7 and in the second work space 8.

According to some non-limiting embodiments, the laser processing machine 1 can also comprise two work tables 54, one arranged in the first work space 7 and the other in the second work space 8. Each work table 54 is configured to support the work pieces 2 (and then, the processed pieces 3).

According to non-limiting some embodiments, the specific work table 54 arranged in the first work space 7 and in the second work space 8 can be chosen and/or changed depending on the dimension of the first work space 7 and of the second work space 8.

The laser processing machine 1 can further comprise a man-machine interface 55.

In use, the processing machine 1 laser-processes work pieces 2 for obtaining processed pieces 3.

In particular, the work pieces 2 are placed in the first work space 7 and in the second work space 8.

The operating position of the dividing wall 9 can be chosen for adjusting the dimensions of the first work space 7 and of the second work space 8.

If wanting to change the dimensions of the first work space 7 and of the second work space 8, the operating position of the dividing wall 9 has to be changed.

According to some embodiments, the operating position can vary in a discrete manner, while according to other alternative embodiments, the operating position can vary in a continuous manner between a first limit position and a second limit position.

When the operating position has been defined, it is possible to start the laser processing.

In order to carry out the processing, the laser device 50 has to be placed in the first work space 7 or in the second work space 8 for carrying out the laser processing in the first work space 7 or in the second work space 8, respectively.

For safety reasons, it is necessary to close the first entrance 17 and the second entrance 18 if a processing is carried out in the first work space 19 (see FIG. 2*b*) and in the second work space 20 (see FIG. 2*a*), respectively.

The sensor device determines the operating position which allows the control unit to adjust the closing device, in particular the first door 19 and the second door 20, for ensuring the correct closing of the first entrance 17 and of the second entrance 18.

Advantageously, the control unit also adjusts the covering device 29 as a function of the operating position of the dividing wall 9.

In more detail, the covering device 29 covers the first work space 7 (see FIGS. 2*b* and 3*c*), in particular by means of the control of the first cover 32 in the respective active configuration, while the laser apparatus 6, in particular the laser device 50, carries out the laser processing of the work piece 2 placed in the second work space 8 (while the second cover 33 is in the respective waiting configuration). Furthermore, the covering device 29 covers the second work space 8 (see FIGS. 2*a* and 3*a*), in particular by means of the control of the respective second cover 33 in the active configuration, while the laser apparatus 6, in particular the laser device 50, carries out the laser processing of the work piece 2 placed in the first work space 7 (while the first cover 32 is in the respective waiting configuration).

During the execution of a laser processing in one between the first work space 7 and the second work space 8 it is possible, for example through an operator or a robot, to remove a processed piece 3 and/or place a new work piece 2 in the other between the first work space 7 and the second work space 8.

In order to carry out at times the laser processing in the first work space 7 and at times in the second work space 8 it is necessary to transfer the laser device 50 from the first work space 7 or from the second work space 8 to the second work space 8 or to the first work space 7. For this reason, it is necessary to control the first cover 32 and the second cover 33 from the active configuration to the waiting configuration if the laser processing was carried out in the second work space 8 or in the first work space 7, respectively.

By examining the characteristics of the processing machine 1 and/or of the housing 4 according to the present invention, the advantages that they allow obtaining are evident.

In particular, the housing 4 allows a greater flexibility. It is possible to change the dimensions of the first work space 7 and of the second work space 8 for adapting them the best way possible to the dimensions of the work pieces 2. For example, it is possible to manage the laser processing of work pieces 2 which have various dimensions.

A further advantage lies in the fact of having the sensor device and the control unit for ensuring the safety of the operators thanks to the precise control of the closing device and/or of the covering device 29 as a function of the detected operating position.

Finally, it is clear that modifications and variations can be made to the described and illustrated processing machine 1 and/or housing 4, which do not depart from the scope of protection defined by the claims.

The invention claimed is:

1. A housing for a laser processing machine to treat, by means of a laser, work pieces, in particular metal work pieces;

the housing comprises:

a dividing wall, which separates a first work space having a first length and a second work space having a second length from one another; wherein the first work space and the second work space are configured to receive the work pieces;

a first entrance to allow access to the first work space;

a second entrance to allow access to the second work space;

a closing device, which is configured to selectively open and close the first entrance and the second entrance; and a control unit, which is operatively connected to the closing device;

wherein the dividing wall is placeable in an operating position, which is variable among at least a first position, a second position and a third position;

wherein the first length and the second length vary as a function of the operating position;

wherein the control unit is configured to control the closing device as a function of the operating position of the dividing wall;

wherein the housing further comprises a sensor device, which is operatively connected to the control unit and is configured to determine the operating position of the dividing wall;

wherein the closing device comprises a first door and a second door, which are configured to selectively open and close the first entrance and the second entrance, respectively;

wherein each one of the first door and the second door is controllable between a respective closing configuration and a respective opening configuration;

wherein the first door and the second door close and free the first entrance and the second entrance, respectively, when they are controlled in the respective closing configuration and the respective opening configuration, respectively;

wherein each one of the first door and the second door extends from a respective housing seat, which is provided in the area of a respective lateral portion of the housing, to the dividing wall, when being controlled in the respective closing configuration;

wherein the control unit is configured to control the closing device as a function of the operating position of the dividing wall as determined by the sensor device;

wherein the control unit is configured to control the extension of the first door and of the second door in dependence of the operating position detected by the sensor device, so as to align the first door and the second door with the dividing wall, when they are controlled in the respective closing configuration; and wherein the control unit is configured to selectively control the first door and the second door as a function of the first length and of the second length.

2. The housing according to claim 1, wherein the first operating position corresponds to a first limit operating position, which determines a first minimum length and a second maximum length, and/or the third operating position corresponds to a second limit operating position, which determines a first maximum length and a second minimum length.

3. The housing according to claim 1 and further comprising a first lateral wall and a second lateral wall, which are spaced apart from one another along a first axis;

wherein the dividing wall is interposed between the first lateral wall and the second lateral wall;

wherein an extension between the dividing wall and the first lateral wall along the first axis determines the first length and an extension between the dividing wall and the second lateral wall along the first axis determines the second length.

4. The housing according to claim 3, wherein the operating position of the dividing wall determines a first extension of the first entrance and a second extension of the second entrance along the first axis.

5. The housing according to claim 1, wherein the housing comprises at least a first guide assembly, a second guide assembly and a third guide assembly, which are arranged in an inner space of the housing and define the first position, the second position and the third position, respectively;

wherein the dividing wall can selectively be coupled to the first guide assembly, to the second guide assembly and to the third guide assembly in order to place the dividing wall in the first position, in the second position and in the third position, respectively.

6. The housing according to claim 1 and further comprising a moving device, which is coupled to the dividing wall and is configured to move the dividing wall along a direction normal to the dividing wall between a first limit position, which corresponds to the first position, and a second limit position, which corresponds to the third position.

7. The housing according to claim 1, wherein the closing device comprises at least one door, which is configured to selectively close the first entrance or the second entrance;

wherein the length of said at least one door is changeable;

wherein the control unit is configured to control said at least one door so that the door extends from a respective lateral portion of the housing to the dividing wall in order to close the first entrance or the second entrance.

8. The housing according to claim 1, wherein the first door and the second door are sliding and/or telescopic doors.

9. The housing according to claim 1 and further comprising:

a covering device, which is configured to selectively cover at least one between the first work space and the second work space;

wherein the control unit is operatively connected to the covering device and is configured to control the covering device as a function of the operating position of the dividing wall.

10. The housing according to claim 9, wherein the covering device comprises a cover, which is controllable at least in an active configuration, in which the cover is configured to cover one between the first work space and the second work space;

wherein the cover extends from a respective lateral portion of the housing to the dividing wall when the cover is controlled in the active configuration.

11. A laser processing machine to treat, by means of a laser, work pieces, in particular metal work pieces, comprising:

a housing according to claim 1; and at least one laser apparatus, which is configured to carry out a laser processing in the first work space and in the second work space.

12. The laser processing machine according to claim 11, wherein the laser apparatus is configured to carry out a laser processing in the first work space and in the second work space while the closing device closes the first work space and the second work space, respectively.

13. The laser processing machine according to claim 11, wherein the laser apparatus comprises at least one laser device, which is selectively placeable in the first work space and in the second work space in order to carry out a laser processing in the first work space and in the second work space, respectively.

14. The housing according to claim 1, wherein the work pieces are metal work pieces.

15. The laser processing machine according to claim 11, wherein the work pieces are metal work pieces.

* * * * *